United States Patent
Brunone

(10) Patent No.: US 9,162,827 B2
(45) Date of Patent: Oct. 20, 2015

(54) SCRAPING DEVICE FOR A TRANSPORTING BELT AND CORRESPONDING MANUFACTURING METHOD

(76) Inventor: René Brunone, Saint-Marcel (FR)

( * ) Notice: Subject to any disclaimer, the term of this patent is extended or adjusted under 35 U.S.C. 154(b) by 0 days.

(21) Appl. No.: 14/124,711

(22) PCT Filed: Jun. 22, 2012

(86) PCT No.: PCT/EP2012/062057
§ 371 (c)(1),
(2), (4) Date: Jun. 4, 2014

(87) PCT Pub. No.: WO2012/175655
PCT Pub. Date: Dec. 27, 2012

(65) Prior Publication Data
US 2014/0262688 A1    Sep. 18, 2014

(30) Foreign Application Priority Data
Jun. 22, 2011   (FR) ...................... 11 55496

(51) Int. Cl.
*B65G 45/16*   (2006.01)
*B65G 45/12*   (2006.01)

(52) U.S. Cl.
CPC ............... *B65G 45/12* (2013.01); *B65G 45/16* (2013.01)

(58) Field of Classification Search
CPC .............................. B65G 45/12; B65G 45/16
USPC ................................................ 198/497, 499
See application file for complete search history.

(56) References Cited

U.S. PATENT DOCUMENTS

| 5,339,947 | A | | 8/1994 | Campanile | |
|---|---|---|---|---|---|
| 5,692,595 | A | * | 12/1997 | Gilbert | 198/499 |
| 5,975,281 | A | * | 11/1999 | Yoshizako et al. | 198/499 |
| 7,004,304 | B1 | | 2/2006 | Smith et al. | |
| 8,602,205 | B2 | * | 12/2013 | Yoshizako et al. | 198/499 |
| 2002/0079196 | A1 | | 6/2002 | Law | |
| 2007/0029169 | A1 | | 2/2007 | Swinderman et al. | |
| 2009/0218196 | A1 | * | 9/2009 | Gronvall et al. | 198/497 |
| 2009/0272625 | A1 | * | 11/2009 | Devries et al. | 198/499 |

FOREIGN PATENT DOCUMENTS

| AU | 2010201913 B1 | 9/2010 |
|---|---|---|
| DE | 9006407 U1 | 9/1990 |
| DE | 4407657 A1 | 9/1995 |
| DE | 19508090 A1 | 9/1996 |
| EP | 0338118 A1 | 10/1989 |
| EP | 0566486 A1 | 10/1993 |
| EP | 0637560 A1 | 2/1995 |
| EP | 0891934 A1 | 1/1999 |
| EP | 2226275 A2 | 9/2010 |
| GB | 2338944 A | 1/2000 |

OTHER PUBLICATIONS

Search Report for Patent Application No. PCT/EP2012/062057.

* cited by examiner

*Primary Examiner* — James R Bidwell
(74) *Attorney, Agent, or Firm* — Soquel Group LLC

(57) ABSTRACT

A device including a supporting structure, at least one scraping member upwardly and downwardly delimited by upstream and downstream sides, and an elastic material that is overmolded on the scraping member and connecting the scraping member to the supporting structure, the upstream side of the scraping member being covered with the overmolded elastic material.

12 Claims, 3 Drawing Sheets

SCRAPING DEVICE FOR A TRANSPORTING BELT AND CORRESPONDING MANUFACTURING METHOD

CROSS-REFERENCES TO RELATED APPLICATIONS

This application claims priority benefit under 35 U.S.C. §371 to International Patent Application No. PCT/EP2012/062057 entitled SCRAPING DEVICE FOR A TRANSPORTING BELT AND CORRESPONDING MANUFACTURING METHOD, and filed by inventor René Brunone on Jun. 22, 2012. International Patent Application No. PCT/EP2012/062057 claims priority to French Patent Application No. 11 55496, filed by inventor René Brunone on Jun. 22, 2011.

FIELD OF THE INVENTION

The invention generally relates to a scraping device for a transporting belt, and a corresponding manufacturing method. More specifically, according to a first aspect, the invention relates to a scraping device for a transporting belt traveling longitudinally from an upstream direction toward the downstream direction, the device including a supporting structure, at least one scraping member upwardly and downwardly delimited by upstream and downstream sides, and an elastic material that is overmolded on the scraping member and connecting the scraping member to the supporting structure.

BACKGROUND OF THE INVENTION

A device of this type is described in EP 0,891,934. The device includes several scraping members, secured to each other by the elastic material. Said material is overmolded on the downstream side of the various scraping members. A rubber skirt is adhered to the upstream side of the various scraping members. It allows the evacuation of residues detached from the transporting belt by the scraping members.

The subassembly formed by the scraping members and the elastic material is mounted between two support plates of the supporting structure.

Such a scraping device is a complex structure, and is costly to manufacture.

In this context, the invention aims to propose a scraping device that is simpler and less expensive.

SUMMARY

To that end, the invention relates to a scraping device of the aforementioned type, characterized in that the upstream side of the scraping member is covered with the overmolded elastic material.

Thus, it is the overmolded elastic material that defines the geometry of the scraping device on the upstream side of the scraping member(s). The overmolding operation makes it possible to give the elastic material of the upstream side of the scraping member a suitable shape for the evacuation of the residues separated from the transporting belt by the scraping member(s). The overmolded elastic material therefore replaces the rubber skirt provided in EP 0,891,934. This rubber skirt is no longer necessary.

Thus, the device according to the invention has no additional member provided to serve as a guide skirt for the residues separated from the transporting band, that function being performed by the overmolded elastic material on the upstream side of the scraping member.

The structure of the scraping device is much simpler, since the rubber part attached on the scraping members is eliminated. The device is more cost-effective to manufacture, since the operations necessary to adhere the skirt on the scraping members are eliminated. The elastic material serving as the skirt is overmolded with the rest of the elastic material, the rest of the elastic material being provided to secure the various scraping members to each other and to connect said scraping member(s) to the supporting structure.

The elastic material covers the majority of the upstream side of the scraping member.

As indicated above, the device includes at least one scraping member, and preferably multiple scraping members. The scraping members are positioned next to one another, in a transverse direction. The transverse direction is perpendicular to the longitudinal direction, and corresponds to the width of the band.

The supporting structure rests on the ground, or alternatively is rigidly fastened on another structure. The other structure is for example a structure for supporting and guiding the transporting band, or a structure including a device for turning over the transporting band, or any other suitable structure.

Preferably, the overmolded elastic material on the upstream side of the scraping member has a free upstream face, said upstream face having a curvature around a substantially horizontal and transverse axis. This means that the upstream face, when considered in cross-section in vertical and longitudinal planes, has curved sections, i.e., non-planar sections.

The upstream face is thus given a suitable geometry for evacuating the residues detached from the transporting band by the scraping members.

Typically, the upstream face has at least one lower zone and one upper zone situated above the lower zone, the lower and upper zones forming an angle comprised between 100° and 175°. Preferably, the angle is comprised between 145° and 175°, and still more preferably between 160° and 175°.

Such an angle is well-suited for guiding the residues separated from the transporting band by the scraping member(s).

The lower zone preferably extends substantially over the entire transverse width of the upstream face. Likewise, the upper zone preferably extends over the entire transverse width of the upstream face. For example, considered in cross-section in a longitudinal and transverse plane, the upper zone is substantially planar and the lower zone is substantially planar. They connect to each other along a junction line. They may also connect to each other using a curved junction line when considered in cross-section in said longitudinal and transverse plane.

Preferably, the scraping member includes a support plate embedded in the elastic material, a wear pad and a separable connection of the wear pad to the support plate.

The wear pad is made from a material withstanding abrasion particularly well, for example tungsten carbide or ceramic.

It is intended to bear against the transporting band and scrape the surface of the transporting band facing the scraping device so as to separate the residues remaining attached to the band from said band. The pad is a wearable part, intended to be changed periodically.

The support plate, on the other hand, is not intended to be replaced periodically, and is positioned permanently in the elastic material. The separable connection is of any suitable type to allow the periodic replacement of the wear pad. For example, the separable connection comprises a nut welded to the support plate and a screw. The support plate and the wear pad have respective orifices positioned across from each other. The nut is welded around the orifice of the support plate, on one side of the plate opposite the wear pad. The screw is engaged through the opposite orifices, and is screwed into the nut.

Alternatively, the orifice of the support plate is tapped, the screw being screwed into the tapped orifice.

It is thus particularly simple to replace the wear pads. It is not necessary to separate the support plates from the elastic material.

The maintenance of the scraping device is greatly simplified.

Preferably, the support plate has a curvature around a substantially horizontal and transverse axis.

The support plate thus has substantially the same shape as the upstream face of the elastic material overmolded on the scraping members.

The screwing of the fastening screw of the wear pad is easier.

Furthermore, such a shape facilitates the molding of the elastic material.

Preferably, the supporting structure comprises a support core, the elastic material being overmolded around the support core.

Thus, the structure of the scraping device is simplified. It is not necessary to provide a transverse beam including several plates fastened to each other by screws, as in EP 0,891,934, and defining a slot between them for receiving the scraping member and the elastic material.

The overmolding of the plastic material around the support core and around the scraping members is typically done in a single step, in a same mold.

The mounting of the scraping members on the supporting structure is thus done very simply, during overmolding of the elastic material. This connection is cost-effective, quick and easy to do. It makes it possible to obtain a flexible connection of the scraping member(s) to the supporting structure, well suited to the operation of the scraping device.

Furthermore, the support core typically has a bowed shape, the concave face of which is turned in the upstream direction. Such a curvature allows better distribution of the pressure of the scraping device on the transporting band, and favors scraping on the central part of the transporting band.

Because the elastic material is overmolded on the support core, the scraping members, which are positioned transversely next to one another, automatically adopt the same arrangement and the same curvature as the support core. They are thus positioned very simply and conveniently along the desired curvature.

Preferably, the supporting structure includes two support subassemblies provided to be positioned transversely on either side of the transporting band, and two separable connections of two end parts of the support core to the two support assemblies.

Thus, it is possible to assemble and disassemble the subassembly including the support core, the elastic material and the scraping member(s) from the two support assemblies, quickly and simply. This is particularly convenient when the scraping device is positioned in a cluttered zone, for example immediately alongside the loading hopper of the band, or an evacuation hopper for the materials transported on the band.

Each separable connection for example includes a screw and a nut, and/or lugs engaged in orifices. Other types of assembly are possible.

Preferably, the support core includes a substantially transverse zone embedded in the elastic material, and two substantially longitudinally oriented zones, extending the transverse zone on either side. These two longitudinal parts extend in vertical and longitudinal planes. They are connected to the two support assemblies by said separable connections.

Preferably, each support assembly includes a stationary post and a mechanism provided to bias the support core in rotation relative to the post around a substantially transverse axis, the mechanism including:
  a beam rigidly connected to the support core;
  a strapping connected to the beam and winding around the beam, the strapping having two end parts opposite one another;
  two connections each connecting one of the two end parts of the strapping to the post, at least one of the two connections being adjustable and being arranged to rotate the beam around the central axis relative to the post using the strapping.

The strapping is typically a metal sheet, and more specifically a flexible metal band.

The connections are arranged to move the strapping selectively in a movement corresponding to a circumferential sliding around the transverse axis, in a clockwise direction or a counterclockwise direction.

The strapping is for example U-shaped, the two end parts of the strapping being positioned vertically above one another.

The two end parts for example extend substantially horizontally.

Preferably, the two connections of the end parts of the strapping are adjustable. Alternatively, only one of the two connections is adjustable, and the other connection is stationary. Each adjustable connection makes it possible to bring the corresponding end part of the strapping closer to or further away from the post, selectively. This movement rotates the beam around the transverse axis, in one direction or the other.

Advantageously, the mechanism comprises:
  a tubular limb centered on said transverse axis and positioned around the beams;
  an elastic member connecting the beam and the tubular limb to each other.

The strapping biases the tubular limb against the post, the beam being connected to the post only by means of the tubular limb and the strapping.

The tubular limb typically has a cylindrical shape. The elastic member is a part made from elastic material, for example polyurethane, positioned between the beam and the central limb. It is adhered toward the inside to a central ring connected to the beam, and toward the outside to the tubular limb. It allows limited rotational travel of the tubular limb relative to the beam, around a transverse axis. When the tubular limb is biased in rotation around a transverse axis, that bias is transferred to the beam by means of the elastic member.

The tubular limb in turn transmits that movement to the support core and the scraping members.

This mechanism makes it possible to adjust the pressure of the scraping members against the transporting band. It also makes it possible to keep the wear pads in contact with the transporting band as the wear pads become worn.

The post typically comprises a cradle having a surface for receiving the tubular limb. That surface is placed vertically between the two end parts of the strapping and between the two connections of the end parts of the strapping to the post. The strapping therefore biases the tubular limb against said surface. The surface is bowed and hugs part of the periphery of the tubular limb.

Said surface therefore vertically bears the weight of the support core, scraping members and elastic material, while allowing slight sliding of the tubular limb relative to the post, so as to allow rotational movement of the tubular limb when the transverse axis returns.

Such a mechanism makes it possible both to bear the subassembly formed by the core, the scraping member(s) and the elastic material, and to bias that subassembly in rotation around a transverse axis against the transporting band. This mechanism is particularly compact, and thus has a reduced bulk. This is particularly important when the scraping device is located in a cluttered zone. Furthermore, the intensity of the biasing of the scraping members against the band may be adjusted particularly conveniently.

Typically, each adjustable connection is of the screw and nut type. However, the connection may be of any other suitable type.

The elastic material overmolded on the scraping member(s) typically comprises polyurethane. Polyurethane is particularly appropriate, since it can be overmolded at atmospheric pressure. However, the elastic material may be of another type, for example natural or synthetic rubber, such as elastomer.

According to a second aspect, the invention relates to a method for manufacturing a scraping device for a transporting band traveling longitudinally from an upstream direction toward the downstream direction, the device comprising:
  a supporting structure;
  at least one scraping member upwardly and downwardly delimited in upstream and downstream sides;
  the method comprising a step for overmolding an elastic material on the scraping member, the elastic material connecting the scraping member to the supporting structure;
  characterized in that the upstream side of the scraping member is covered by the overmolded elastic material.

Preferably, the elastic material is overmolded on the support core of the supporting structure, during said overmolding step of the elastic material on the scraping member.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
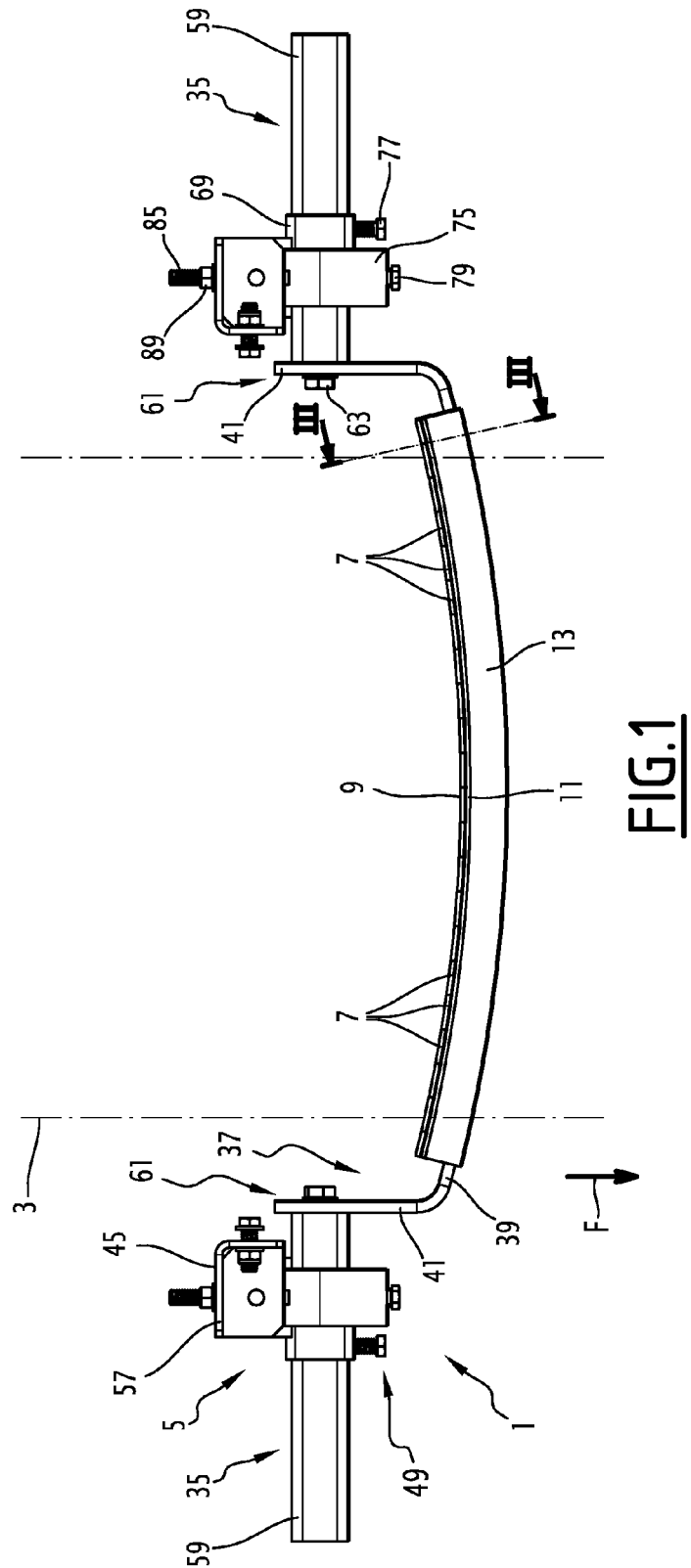
FIG. 1 is a top view of the scraping device according to the invention.

The scraping device 1 shown in FIGS. 1 to 4 is intended to scrape the surface of a transporting band 3, in particular shown in FIG. 1. It is intended to eliminate the residues of transported materials remaining on the transporting band after unloading thereof.

Typically, the transporting band is arranged in a loop between two turnover rollers, and includes a transport strand and a return strand. The transport strand is loaded with material to be transported near a first turnover roller. The material is unloaded from the transporting band near the second turnover roller. The scraping device is positioned so as to scrape the return strand, immediately downstream from the second turnover roller.

In the present description, the terms "upstream" and "downstream" are to be understood relative to the direction of movement of the transporting band.

The face of the band receiving the materials is for example turned upward along the transport strand, and is turned downward along the return strand, at least at the scraping device. The scraping device is therefore placed below the return strand of the transporting band.

It should be noted that the return strand of the transporting band may also be used to transport materials.

In FIG. 1, the travel direction of the transporting band from upstream to downstream is shown by arrow F.

The device 1 comprises:
  a supporting structure 5;
  several scraping members 7 upwardly and downwardly delimited by upstream and downstream sides 9 and 11 (FIG. 3);
  an elastic material 13 overmolded on said scraping members 7 and connecting the scraping members 7 to the supporting structure 5.

Figure 3:
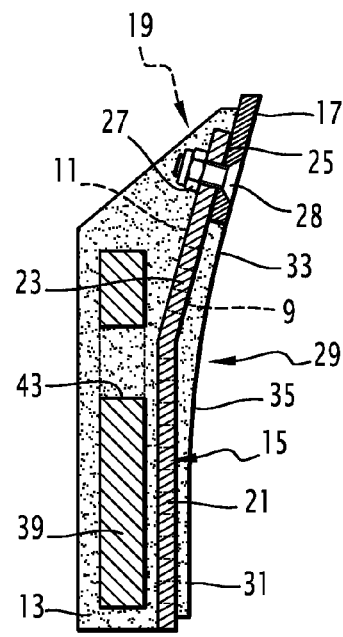
FIG. 3 is a cross-sectional view considered along the incidence of arrows III of FIG. 1.

As shown in FIG. 3, each scraping member includes a support plate 15, a wear pad 17, and a separable connection 19 of the wear pad 17 to the support plate 15.

The support plate 15 is a metal plate, oriented substantially vertically and transversely. It includes a substantially planar lower part 21 and a substantially planar upper part 23, the lower and upper parts being in planes that are inclined relative to one another. The part 23 extends the part 21 upward and in the upstream direction. The angle between the parts 21 and 23 is approximately equal to 170°.

The wear pad 17 is pressed against one side of the support plate 15 turned in the upstream direction. It is pressed against an upper edge zone of the support plate 15, referenced 25. The separable connection 19 comprises a nut 27 and a screw 28. The wear pad 17 and the support plate 15 include respective orifices placed coinciding with one another. The nut 27 is welded to the support plate 15, and positioned on one face of the support plate 15 turned in the downstream direction. It is placed coinciding with the orifice of the plate. The screw 28 is engaged through the two orifices and is engaged with the nut 27.

The elastic material 13 is a polyurethane. The elastic material forms a molded block. All of the scraping members 7 are embedded in the elastic material and are thus connected to each other by the elastic material 13. More specifically, as shown in FIG. 3, the plate 15 of each of the scraping members is embedded in the elastic material 13. The wear pad 17 protrudes upward relative to the elastic material 13. The upstream side 11 of the scraping member is partially covered by the overmolded elastic material. The downstream side 11 is practically completely covered by the overmolded elastic material.

On the upstream side, the elastic material 13 covers substantially the entire upstream face of the support plate 15, with the exception of the upper edge zone 25 against which the wear pad 17 is pressed. On the downstream side, the entire support plate 15 is covered by the elastic material.

On the downstream side, the wear pad 17 is not at all covered by the elastic material.

In the upstream direction, the elastic material defines a free upstream face 29, configured to facilitate the evacuation of the residues detached from the transporting band by the wear pad 17.

The upstream face 29 has a curvature around a substantially horizontal and transverse axis. More specifically, it has a lower zone 31 that is substantially planar extending over the entire transverse width of the block of elastic material, a substantially planar upper zone 33 also extending over the entire width of the block of elastic material, and a junction zone connecting the zones 31 and 33 to one another. The junction zone is a line or zone having a curvature around a horizontal axis. The upper zone 33 is situated above the lower zone 31. It extends upward and in the upstream direction from the junction zone. The lower and upper zones together form an angle substantially equal to 170°.

The supporting structure 5 comprises two support assemblies 35 positioned transversely on either side of the transporting band, and a support core 37 of the scraping members.

The support core 37 includes a substantially transverse bowed central part 39, extended by two ends 41 oriented substantially longitudinally. The core 37 is a metal plate positioned substantially vertically. The bowed part 39 has a concave face turned in the upstream direction. It is embedded in the overmolded elastic material 13. As shown in FIG. 3, it is completely enveloped by the elastic material, and has holes 43 making it possible to secure the masses of elastic material situated on either side of the support core to each other.

Figure 4:
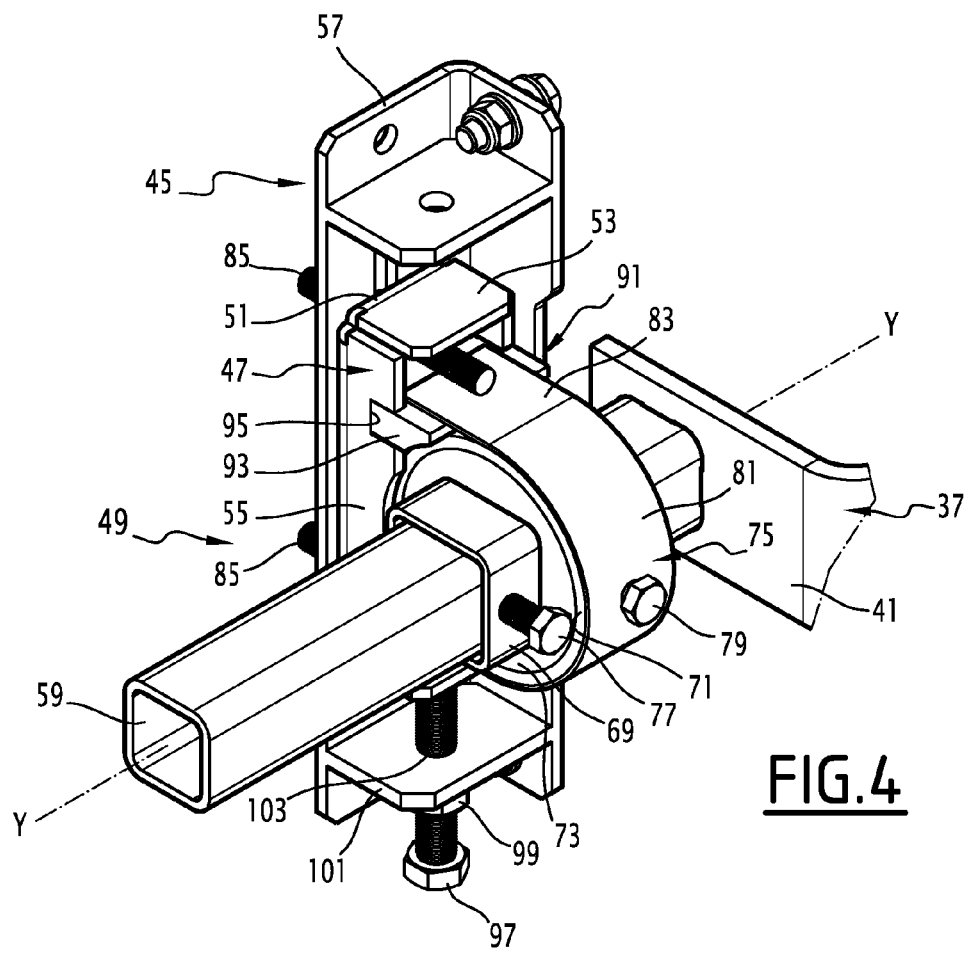
FIG. 4 is an enlarged perspective view of part of the device of FIG. 1, more particularly showing the mechanism making it possible to bias the scraping members against the transporting band.

As in particular shown in FIG. 4, each support assembly 35 includes a stationary post 45, a slide 47 whereof the position is vertically adjustable relative to the post 45, and a mechanism 49 provided to move the support core 37 in rotation relative to the post 45 around a substantially transverse axis, referenced Y in FIG. 4.

The stationary post 45 is for example an L-shaped profile with a vertical orientation, rigidly fastened to a structure resting on the ground. The structure is not shown.

The slide 47 is a hollow piece with a substantially parallelepiped shape. It includes a bottom 51 and four walls 53, 55 rigidly fastened to the bottom and perpendicular thereto. The walls 53 are parallel to and opposite one another. The walls 55 are parallel to and opposite one another, and are perpendicular to the walls 53. The bottom 51 is pressed against a wing 57 of the post. The slide 47 is open opposite the bottom 51.

Each support assembly also comprises a transverse hollow beam 59, and a separable connection 61 of the hollow beam to the support core 37. The hollow beam 59 has a substantially square section.

Figure 2:
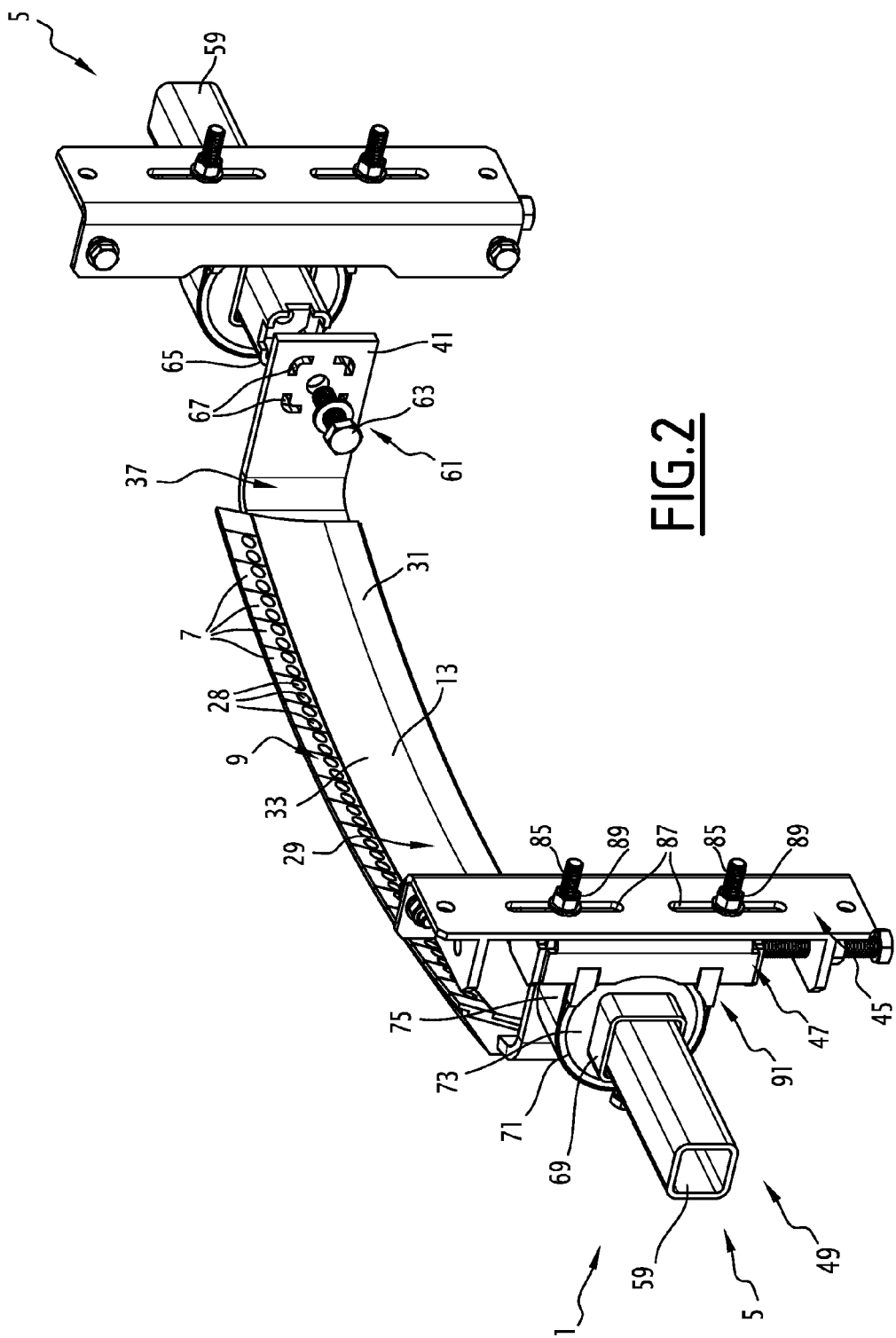
FIG. 2 is a perspective view of the device of FIG. 1.

The connection 61 connects one end of the beam 59 to the end part 41 of the support core situated on the side of the corresponding support assembly. As shown in FIG. 2, the connection 61 comprises a screw-nut assembly 63, and raised portions 65 formed on the beam 59 and engaged in orifices 67 formed on the support core. The nut of the screw-nut assembly 65 is not shown in FIG. 2. It is for example welded on an inner partition of the beam 59. The raised portions 65 are for example formed on the free edge of the beam 59 and protrude toward the end part 41 of the support core. Each for example is in the shape of an L. The orifices 67 are also L-shaped and pass through the entire thickness of the core. The connection 61 secures the beam 59 and the support core 37 in rotation around the transverse axis.

As shown in FIG. 4, the mechanism 49 further comprises a central limb 69, a tubular limb 71 positioned around the central limb 69, an elastic member 73 connecting the central limb and the tubular limb to each other, and a strapping 75 winding around the tubular limb 71. The central limb 69 is a metal ring with a substantially square section, slid around the beam 59. A screw 77 makes it possible to lock the rotation of the beam 59 transversely inside the limb 69. It is thus possible to adjust the position of the beam 59 in the transverse direction relative to the central limb 69.

The tubular limb 71 has a generally cylindrical shape with a transverse central axis. The elastic member 73 is a polyurethane block, adhered toward the inside on an inner surface of the central limb 69, and adhered toward the outside on an inner surface of the tubular limb 71.

The strapping 65 is a flexible band of a metal material. It is rigidly fastened to the tubular limb 71 by a screw 79. The strapping 75 is generally U-shaped. It has a central part 81 that is substantially semicircular and is pressed against an outer surface of the tubular limb 71, extended by two end parts 83, which are substantially planar and parallel to each other. The central part 81 is pressed against a zone of the outer surface of the tubular limb 71 opposite the stationary post 45. Two threaded rods 85 are welded to the end parts 83. The threaded rods 85 are engaged in slots 87 formed in the wing 57 of the post (FIG. 2). The slots 87 are oriented vertically. Nuts 89 are screwed on the threaded rods 85. The nuts 89 bear, by means of washers, against a face of the wing 57 opposite the strapping 75.

The support assembly 35 also includes a cradle 91, made from polyethylene, intended to support the tubular limb 71. The cradle 91 is engaged inside the slide 47. It is rigidly fastened relative to the slide 47, for example using parts 93 forcibly engaged in notches 95 cut into the walls 55. The cradle 91 has, toward the tubular limb, a bowed surface, with a curvature substantially corresponding to the curvature of the outer surface of the tubular limb 71. The surface is not shown in FIG. 4.

The end parts 83 of the strapping are pressed against the cradle 91, one above and one below the cradle 91. The cradle 91 therefore serves as a spacer and maintains a predetermined vertical separation between the two end parts 83 of the strapping 75.

The tubular limb 71 is biased against that support surface by the strapping 75. Thus, the tubular limb 71 is pressed on the one hand against the support surface of the cradle 91, and on the other hand by the central part 81 of the strapping 75.

Lastly, so as to allow the position of the slide 47 to be adjusted in the vertical direction relative to the post 45, the support assembly comprises a screw and nut device 97, 99. To that end, a plate 101 is provided secured to the post 45, below the slide 47. The plate 101 is substantially horizontal and has an orifice 103. The nut 99 is welded below the plate 101, coinciding with the orifice 103. The screw 97 extends vertically. It is screwed in the nut 99, and its end bears on and against the wall 53 of the slide. Thus, by screwing or unscrewing the screw 97, it is possible to adjust the vertical position of the slide 47 relative to the post 45. Due to this movement, the threaded rods 85 move along the slots 87.

The operation of the scraper described above will now be outlined.

The posts 45 are fastened on a rigid structure resting on the ground.

The transverse structure of the support core 37 relative to the post 35 can be adjusted by moving the hollow beams 59 relative to the central limbs 69 of the two support assemblies. Once this transverse position is adjusted, the screw 77 is tightened, so as to lock the beams 59 transversely relative to the posts 45.

To use the scraping device, the support core 37 is biased in rotation around the transverse axis Y, such that the wear pads 17 bear with a predetermined torque against the transporting band 3. To that end, the nut 89 situated highest is screwed in a direction such that the threaded rod 85 pulls the corresponding end 83 of the strapping toward the post 45. In parallel, the nut 89 situated lowest is rotated in the opposite direction. This results in moving the strapping 75 around the axis Y in the counterclockwise direction in FIG. 4. The tubular limb 71 is thus rotated around the axis Y. This bias is transmitted by the elastic material 73 to the central limb 69 and the beam 59. The beam 59 is rigidly fastened to the support core, and in turn rotates the support core.

The cradle 91 is made from a material chosen to allow the tubular limb 71 to slide against the support surface.

When it is necessary to change the wear pads, the reverse movement is performed. The upper nut 89 is rotated in a direction such that the corresponding end 83 of the strapping is moved in the direction of a separation relative to the post 45, and the lower nut 89 is rotated in the opposite direction. The wear pads are thus separated from the band. The screws 28 are next unscrewed and the pads 17 are separated from the plates 15.

New pads may next be placed, and the screws 28 are once again screwed in the nuts 27.

The invention claimed is:

1. A scraping device for a transporting belt traveling longitudinally from an upstream direction toward a downstream direction, the device comprising:
   a supporting structure;
   a scraping member delimited by upstream and downstream sides turned respectively toward the upstream and downstream directions, the scraping member comprising a support plate oriented substantially vertically and transversely, the support plate comprising substantially planar upper and lower parts that extend in planes that are inclined to one another, the upper part extending the lower part upward and in the upstream direction, such that the support plate has a curvature around a substantially horizontal transverse axis, the vertical direction being substantially perpendicular to a horizontal ground on which said support structure rests, and the transverse direction being perpendicular to the longitudinal direction and to the vertical direction; and
   an elastic material that is overmolded on said scraping member covering the upstream side of said scraping member, and connecting said scraping member to said supporting structure.

2. The device according to claim 1, wherein said elastic material covering the upstream side of said scraping member has a free upstream face, the upstream face having a curvature around the substantially horizontal transverse axis.

3. The device according to claim 2, wherein the upstream face has an upper and a lower zone that form an angle between 100° and 175°.

4. The device according to claim 1, wherein said scraping member comprises a wear pad and a separable connection of the wear pad to said support plate, and wherein said support plate is embedded in said elastic material.

5. The device according to claim 1, wherein said supporting structure comprises a support core, said elastic material being overmolded around said support core.

6. The device according to claim 5, wherein said supporting structure comprises two support subassemblies provided to be positioned transversely on either side of the transporting belt, and two separable connections of two end parts of said support core to said two support subassemblies.

7. The device according to claim 6, wherein each support subassembly comprises:
   a stationary post; and
   a mechanism provided to bias said support core in rotation relative to said post around a substantially transverse axis, the mechanism comprising:
      a beam rigidly connected to said support core;
      a strapping connected to and winding around said beam, the strapping having two end parts opposite one another; and
      two connections each connecting one of the two end parts of said strapping to said post, at least one of the two connections being adjustable and being arranged to rotate said beam around the central axis relative to said post using said strapping.

8. The device according to claim 7, wherein for each support subassembly, said mechanism further comprises:
   a tubular limb connected to said beam and positioned around said beam; and
   an elastic member connecting said beam and said tubular limb to each other,
   said strapping biasing said tubular limb against said post, and said beam being connected to said post only by means of said tubular limb and said strapping.

9. A method for manufacturing a scraping device for a transporting belt traveling longitudinally from an upstream direction toward a downstream direction, the device comprising:
   a supporting structure; and
   at least one scraping member delimited by upstream and downstream sides turned respectively toward the upstream and downstream directions, the scraping member comprising a support plate oriented substantially vertically and transversely, the support plate comprising substantially planar upper and lower parts that extend in planes that are inclined to one another, the upper part extending the lower part upward and in the upstream direction, such that the support plate has a curvature around a substantially horizontal transverse axis, the vertical direction being substantially perpendicular to a horizontal ground on which the support structure rests, and the transverse direction being perpendicular to the longitudinal direction and to the vertical direction;
the method comprising overmolding an elastic material on the scraping member, the elastic material covering the upstream side of the scraping member, and the elastic material connecting the scraping member to the supporting structure.

10. The device according to claim 1, wherein said lower part encompasses a lower end of said support plate.

11. The device according to claim 1, wherein said lower part defines a lower end of said support plate.

12. The device according to claim 1, wherein said lower part extends in a plane substantially vertical and transversal.

* * * * *